US009552342B2

(12) United States Patent
Portnoy et al.

(10) Patent No.: US 9,552,342 B2
(45) Date of Patent: Jan. 24, 2017

(54) GENERATING A COLLAGE FOR RENDERING ON A CLIENT COMPUTING DEVICE

(71) Applicant: Microsoft Corporation, Redmond, WA (US)

(72) Inventors: Will Portnoy, Woodinville, WA (US); Craig Jensen, Sammamish, WA (US); Tom Laird-McConnell, Kirkland, WA (US); James H. Lewallen, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 14/151,710

(22) Filed: Jan. 9, 2014

(65) Prior Publication Data

US 2015/0193409 A1     Jul. 9, 2015

(51) Int. Cl.
*G06F 17/00*     (2006.01)
*G06F 17/24*     (2006.01)

(52) U.S. Cl.
CPC .................................... *G06F 17/24* (2013.01)

(58) Field of Classification Search
CPC ...................................................... G06F 17/24
See application file for complete search history.

(56) References Cited

U.S. PATENT DOCUMENTS

| 7,143,357 | B1* | 11/2006 | Snibbe | G06F 3/0483 709/204 |
| 7,739,583 | B2* | 6/2010 | Barrus | G06F 17/3089 358/462 |
| 7,904,797 | B2* | 3/2011 | Wong | G06F 17/30017 715/200 |
| 8,504,932 | B2* | 8/2013 | Quek | G06T 11/60 715/710 |
| 2005/0033758 | A1* | 2/2005 | Baxter | G06F 17/30038 |
| 2006/0294571 | A1* | 12/2006 | Moore | H04N 7/17318 725/135 |
| 2007/0098266 | A1* | 5/2007 | Chiu | G06F 17/30265 382/224 |
| 2008/0091526 | A1* | 4/2008 | Shoemaker | G06Q 20/10 705/14.55 |

(Continued)

*Primary Examiner* — Laurie Ries
(74) *Attorney, Agent, or Firm* — Steve Wight; Sandy Swain; Micky Minhas

(57) ABSTRACT

Various technologies pertaining to generation of a client collage are described herein. A creator can construct a computer-implemented collage by selecting a plurality of computer-implemented objects from a respective plurality of network-accessible storage locations, and arranging the computer-implemented objects in a desired manner. Responsive to receiving an indication that the computer-implemented collage is suitable for publication, a server can render the collage and capture a backdrop image of the rendered collage. The server can further generate metadata that are packaged with the backdrop image as a client collage. When a client computing device requests the collage, the client collage is provided to the client computing device, which renders the backdrop image and processes the metadata. The metadata causes a click overlay to be placed upon the backdrop image, wherein functionality of the click overlay is defined by the metadata.

20 Claims, 9 Drawing Sheets

(56) References Cited

U.S. PATENT DOCUMENTS

| | | | |
|---|---|---|---|
| 2008/0193048 A1* | 8/2008 | Sun | G06T 11/60 382/284 |
| 2008/0215984 A1* | 9/2008 | Manico | G06F 17/30035 715/730 |
| 2008/0304431 A1* | 12/2008 | Karaoguz | G06Q 10/109 370/310 |
| 2008/0306995 A1* | 12/2008 | Newell | G06F 17/30265 |
| 2010/0005417 A1* | 1/2010 | Lanahan | G06F 3/0481 715/815 |
| 2010/0180218 A1* | 7/2010 | Boston | G06F 3/0481 715/759 |
| 2010/0226566 A1* | 9/2010 | Luo | G06K 9/34 382/164 |
| 2011/0026836 A1* | 2/2011 | Ptucha | G06T 11/60 382/209 |
| 2011/0029914 A1* | 2/2011 | Whitby | G06T 11/60 715/781 |
| 2011/0097011 A1* | 4/2011 | Lim | G06T 11/60 382/264 |
| 2011/0218984 A1* | 9/2011 | Gaash | G06F 17/30241 707/706 |
| 2011/0249953 A1* | 10/2011 | Suri | G11B 27/034 386/239 |
| 2011/0285748 A1* | 11/2011 | Slatter | G06T 11/60 345/629 |
| 2012/0102431 A1* | 4/2012 | Krolczyk | G06F 17/30044 715/790 |
| 2012/0105875 A1* | 5/2012 | Chinnici | G06T 11/60 358/1.9 |
| 2012/0206771 A1* | 8/2012 | Cok | G06T 11/60 358/1.18 |
| 2012/0284594 A1* | 11/2012 | Norwood | G06F 3/0481 715/202 |
| 2013/0125069 A1* | 5/2013 | Bourdev | G06F 3/048 715/863 |
| 2013/0307997 A1* | 11/2013 | O'Keefe | H04L 51/10 348/207.1 |
| 2013/0314434 A1* | 11/2013 | Shetterly | G09G 5/14 345/593 |
| 2014/0086508 A1* | 3/2014 | Tang | G06K 9/00684 382/284 |
| 2014/0365887 A1* | 12/2014 | Cameron | G06F 17/30058 715/716 |
| 2015/0100578 A1* | 4/2015 | Rosen | G06F 17/30598 707/737 |
| 2015/0178786 A1* | 6/2015 | Claessens | G06Q 30/0269 705/14.66 |

* cited by examiner

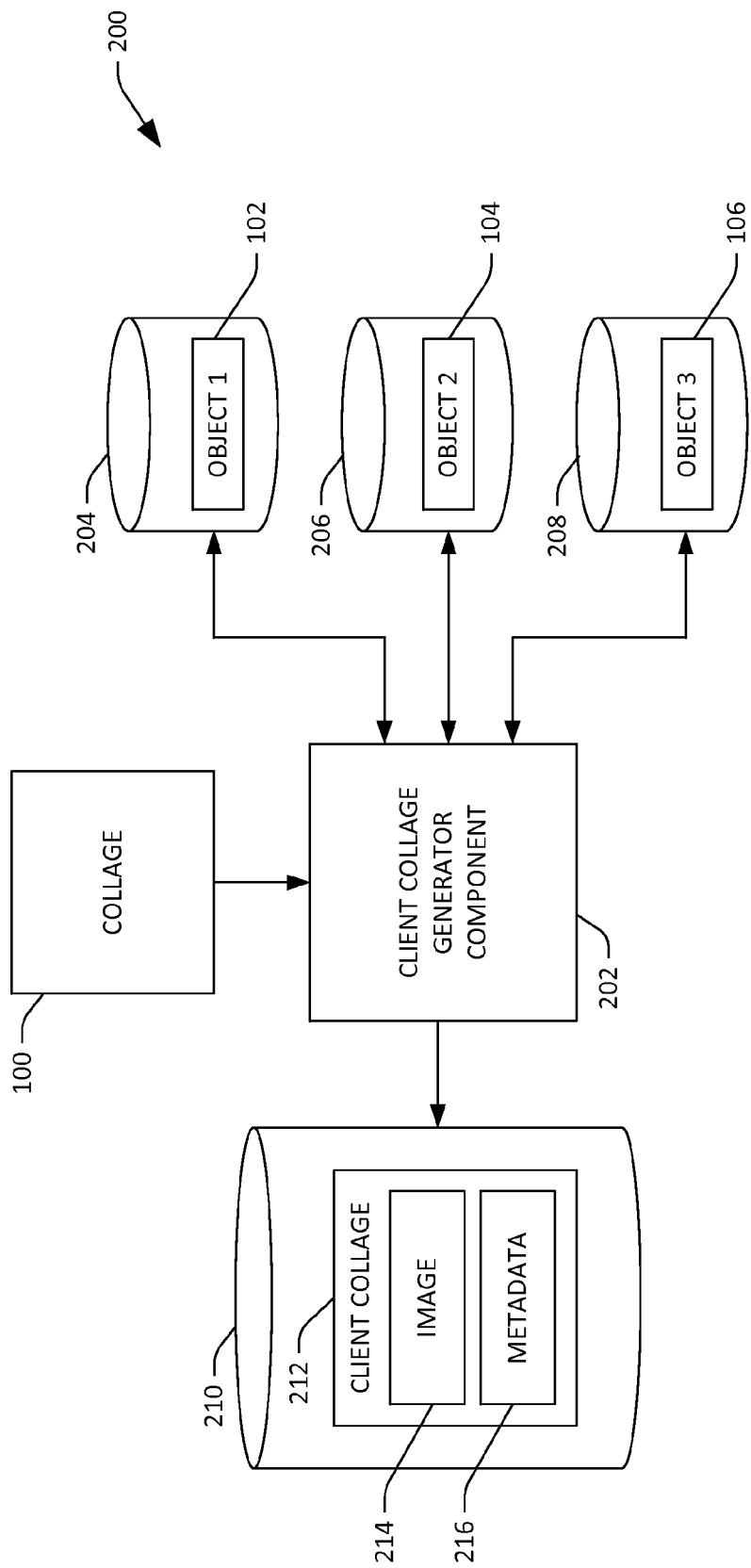

GENERATING A COLLAGE FOR RENDERING ON A CLIENT COMPUTING DEVICE

BACKGROUND

A collage is a medium of expression where items (such as photographs, paintings, sketches, sculptures, etc.) representing conceptually-related content are positioned in relation to one another to form an expressive piece. To create a collage, an artist selects (or creates) a plurality of these types of items, and arranges such items to form the final expressive piece. It can therefore be ascertained that a conventional collage can include numerous items of different types, where items in the collage may be created by different respective artists.

Relatively recently, applications have been developed that can be employed by end users to create computer-implemented collages. In an example, a user can select numerous objects of different types, arrange such objects on a computer-implemented canvas to form a collage, and subsequently publish (post) the computer-implemented collage for viewing by others. The numerous objects are typically retrieved by the user from different respective network-accessible storage locations. Types of the objects that can be included in a collage comprise digital images, videos, animated images, interactive content (e.g., games), text, etc. The creator of the computer-implemented collage arranges and sizes the objects to create the final piece, which may then be published by the creator (e.g., on a social networking web page).

As indicated above, the created computer-implemented collage can include multiple objects from multiple respective network-accessible source locations. When a client computing device attempts to render the collage on a display screen thereof, the client computing device must open network connections to retrieve the objects from their respective network-accessible locations. The client computing device is then tasked with downsampling the retrieved objects and appropriately arranging the resultant downsampled objects to render the collage on the display screen. This process of opening up several network connections and downsampling objects (images) consumes processing resources of the client computing device and thus, in the case of mobile devices, consumes battery life. Moreover, it is possible that an object in the collage may have been removed from its network-accessible storage location or changed since creation of the collage. Accordingly, the collage may change in a manner not intended by the creator of the collage. Additionally, since the client computing device must fetch content from multiple sources, rendering performance on the client computing device is dependent upon the bandwidth and availability of external networks.

To overcome at least some of these deficiencies, content distribution networks (CDNs) have cached objects used to create a collage to ensure that the content of the collage does not change over time. A CDN can mitigate issues with transient networks, such as when an object included in a collage has not been removed from the web, but is (temporarily) unavailable at a site hosting the object. Without the CDN, multiple requests for the object may be made to the site hosting the object, potentially impacting availability of the site or operational costs of the site. It can be ascertained, however, that a client computing device that accesses the collage must still fetch the objects referenced therein from multiple locations of the CDN to assemble the objects to form the collage.

SUMMARY

The following is a brief summary of subject matter that is described in greater detail herein. This summary is not intended to be limiting as to the scope of the claims.

Various technologies pertaining to generating a computer-implemented collage for rendering on a client computing device (referred to as a "client collage") are described herein. Pursuant to an example, a user can create a computer-implemented collage (referred to as a "created collage") by selecting (and optionally editing) multiple objects from multiple respective network accessible storage locations, and arranging the objects to form the created collage. The objects may be of varying media types, including but not limited to images, videos, animated images, interactive content, etc. Accordingly, for example, a created collage may include a static image stored at a first network-accessible location, a video stored at a second network-accessible location, an animated image stored at a third network-accessible location, interactive content stored at a fourth network-accessible location, and text stored at a fifth network-accessible location.

Responsive to receipt of the created collage, a client collage can be created, wherein creation of the client collage includes: 1) generating a static backdrop image that is representative of content of the created collage; and 2) generating metadata that can be interpreted by an application executing on a client computing device to render the client collage in the manner desired by the creator of the created collage. With more particularity, the static backdrop image comprises portions that are respectively representative of the objects in the created collage, wherein the portions are spatially arranged as the objects in the created collage are spatially arranged (e.g., the backdrop image reflects the spatial arrangement of objects in the created collage).

Therefore, for a created collage that comprises only images, the static backdrop image is entirely representative of the created collage. When a client computing device requests the created collage, rather than the client computing device opening a relatively large number of network connections to retrieve the respective objects in the created collage, the client computing device need only open a relatively small number of network connections (e.g., one network connection for the backdrop image and one network connection for the metadata). When the computer-implemented collage includes objects other than images, such as video, animated images, interactive content, etc., the backdrop image can be created by acquiring frames from such objects that are representative of their respective content. For instance, with respect to a video, a first frame of the video can be retrieved, and the portion of the backdrop image that is representative of the first video can be the first frame of the video. Likewise, with respect to an animated image, a first frame of the animated image can be retrieved, and the portion of the backdrop image that is representative of the animated image can be a first frame of the animated image.

Additionally, metadata can be generated that describes the created collage and the objects therein. For example, the metadata can identify the boundaries of the respective portions in the backdrop image, wherein the boundaries correspond to the spatial arrangement of the object in the created collage. Furthermore, the metadata can identify the respective sources of the objects in the created collage. Such information can include a textual description of the source of an object, as well as a link to the network accessible location of the object. The metadata can further correlate the boundaries of the respective portions of the backdrop image with the data that identifies the sources of the objects respectively represented by such portions of the backdrop image. Moreover, the metadata can include graphical data that is overlaid on portions of the backdrop image that are respectively representative of video objects in the created collage. This graphical data can identify to a viewer of the client collage that the portion of the image represents a video.

When the image and the metadata are generated, the image and metadata are stored as the client collage in a network-accessible storage location. When a client computing device transmits a request for the created collage, the client collage is provided to the client computing device. Accordingly, rather than the client computing device having to open a relatively large number of network connections to retrieve the multiple objects in the created collage, the client computing device can be provided with the client collage over a relatively small number of network connections. The client computing device, responsive to receiving the client collage, renders the backdrop image on the display screen of the client computing device. For video represented in the backdrop image, when a portion of the rendered backdrop image that is representative of the video is selected, the video can be retrieved from its source location and overlaid on the portion of the rendered backdrop image that is representative of the video. For animated images represented in the backdrop image, the metadata can cause the client computing device to automatically retrieve the referenced animated image from its source location and overlay the animated image above the portion of the backdrop image that is representative of the animated image. In an example, where a collage includes five static images and one animated image, the client computing device can open three network connections rather than seven: 1) two network connections to retrieve the client collage (the backdrop image and associated metadata); and 2) a third network connection to retrieve the animated image. The backdrop image can be periodically updated at a server to ensure that one or more objects in the computer-implemented collage have not expired (e.g., the owners of such objects have not removed them from their respective network accessible locations).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a functional block diagram of an exemplary system that facilitates generating a client collage.

DETAILED DESCRIPTION

Figure 1:
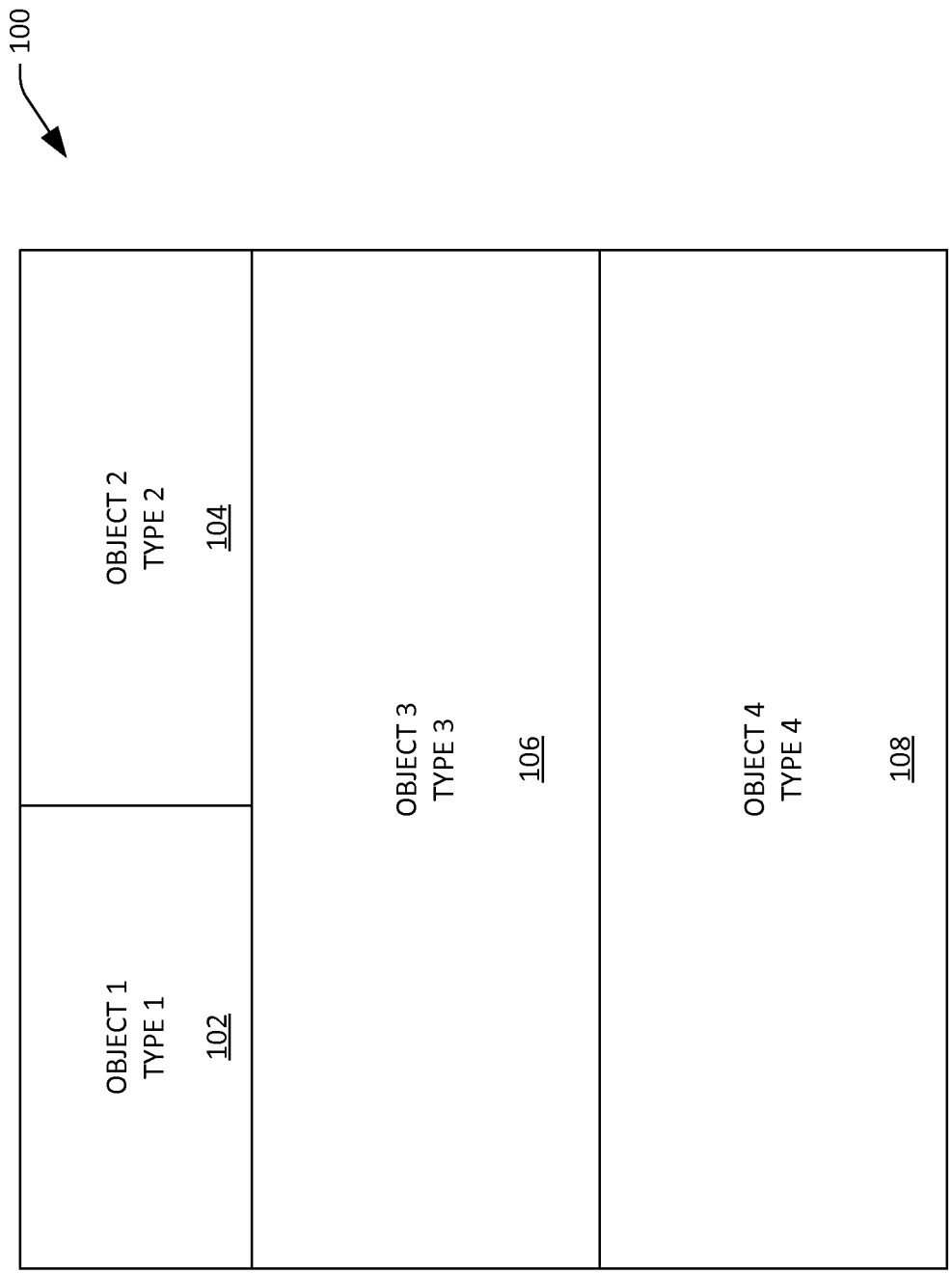
FIG. 1 illustrates an exemplary computer-implemented collage.

Various technologies pertaining to rendering computer-implemented collages on a display screen of a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary computer-implemented collage 100 is illustrated. The collage 100 can be created by way of any suitable tool, wherein the creator of the collage can select multiple objects stored at respective multiple different network-accessible storage locations, and arrange such objects on a computer-implemented canvas to form the collage 100. Additionally, the creator can optionally edit at least one object used to form the collage 100, wherein the act of editing can include, but is not limited to, altering a hue of an image, cropping an image, modifying a video, etc. The exemplary collage comprises four different objects: a first object 102, a second object 104, a third object 106, and a fourth object 108. As noted above, the objects 102-108 originate at respective source locations. Accordingly, the first object 102 can be retained at and acquired from a first network-accessible storage location, the second object 104 can be retained at and acquired from a second network-accessible storage location, the third object 106 can be retained at and acquired from a third network-accessible storage location, and the fourth object 108 can be retained at and acquired from a fourth network-accessible storage location. Further, the objects 102-108 may be of varying types. For instance, as shown in FIG. 1, the first object 102 can be of a first media type, the second object 104 can be of a second media type, the third object 106 can be of a third media type, and the fourth object 108 can be of a fourth media type. Pursuant to an example, the first media type may be a static image, the second media type may be a video, the third media type may be an animated image, and the fourth media type may be text. Other media types are also contemplated, such as interactive content (e.g., a game).

Furthermore, the objects 102-108 are arranged in the collage 100 with a certain spatial arrangement. While the exemplary spatial arrangement of the collage 100 is shown to be "packed", where the objects 102-108 are immediately adjacent to one another, it is contemplated that contents of a collage may be distributed, such that empty space may exist in the collage 100. Moreover, while the collage 100 is shown as including four objects, it is to be understood that a collage may include more objects than four, less objects than four, or exactly four objects. The objects 102-108 can include information depicting their network-accessible source locations. In addition, in an exemplary embodiment, the collage 100 may be created as a post on a social media web site, where the collage 100 is desirably published for review by others, and where the post can include text related to other media objects in the collage.

With reference now to FIG. 2, an exemplary system 200 that facilitates generating a client collage is illustrated. A "client collage" refers to collage data provided to a client computing device responsive to the client computing device requesting a collage, such as the collage 100, from a server (referred to as a "created collage"). As will be described in greater detail herein, the client collage is formed in a manner to reduce burdens placed upon a client computing device when rendering a collage thereon. The system 200 includes a client collage generator component 202 that receives the collage 100 responsive to, for example, the creator of the collage 100 indicating that the collage 100 is desirably published. Thus, while not shown, a server can comprise the client collage generator component 202, wherein the server is associated with a social networking website, a news website, or the like. To generate the client collage, the client collage generator component 202 can be configured to render the collage 100 in memory. Accordingly, responsive to the client collage generator component 202 receiving the collage 100, the client collage generator component 202 can retrieve the objects 102-108 from their respective network accessible storage locations. Accordingly, responsive to receipt of the collage 100, the client collage generator component 202 can transmit the following requests: 1) a first request to retrieve the first object 102 from a first network accessible storage location 204; 2) a second request to retrieve the second object 104 from a second network accessible storage location 206; and 3) a third request to retrieve the third object 106 from a third network accessible storage location 208. As the fourth object 108 has been described as being text in the collage 100, the client collage generator component 202 can receive the text directly from the collage 100. Alternatively, the text may be retained at a fourth network-accessible storage location, and can be retrieved by the client collage generator component 202 responsive to receiving the collage 100.

The client collage generator component 202 can ensure that the objects 102-106 referenced in the collage 100 are still accessible from their respective network accessible storage locations 204-208. When an object is no longer accessible at its storage location, then it can be inferred that an owner of the object no longer desires to make the object available for viewing by others. In an exemplary embodiment, when the client collage generator component 202 determines that an object referenced in the collage 100 is no longer available, the client collage generator component 202 can mark the collage 100 as being invalid, such that the collage 100 is not made available for rendering on a client computing device that requests access to the collage 100. In another example, the client collage generator component 202 can be configured to automatically render the collage 100 without the missing object therein. Accordingly, for example, if the third object 106 is no longer available at the third network-accessible storage location 208, the client collage generator component 202 can render the collage 100 such that the first object 102, the second object 104, and the fourth object 108 are rendered, while the third object is not rendered. For instance, the client collage generator component 202 can reconstruct the collage 100 such that no empty space exists (e.g., the second object 104 is moved, and the first and second objects are expanded). In yet another example, the client collage generator component 202 can render the collage 100 such that a blank or white space is rendered in place of the third object 106. It is to be further understood that the client collage generator component 202 can downsample imagery in the objects 102-106 when rendering the objects 102-106, when appropriate.

The system 200 further includes a data store 210 that is accessible to the client collage generator component 202, where the client collage generator component 202 is configured to generate a client collage 212 based upon the rendering of the collage 100. With more detail relating to rendering the collage 100, responsive to retrieving the objects 102-106 from their respective network-accessible storage locations 204-208, the client collage generator component 202 renders the collage 100, where, in the rendering, the objects 102-108 have the spatial arrangement desired by the creator of the collage 100. Responsive to rendering the collage 100, the client collage generator component 202 can capture a (single) static backdrop image 214 of the rendered collage 100, wherein the client collage 212 includes the backdrop image 214. The backdrop image 214 includes multiple portions that are respectively representative of the objects 102-108 of the collage 100. As noted above, the collage 100 may include objects that are of a dynamic type, such as an interactive game, an animated image, a video, etc. Accordingly, to generate the backdrop image 214, the client collage generator component 202 can, for each object of a dynamic type, retrieve a respective frame that is indicative of content of an object. For instance, as noted above, the second object 104 may be a video. The client collage generator component 202 can select a frame of the video that is indicative of content of the video, and can render the collage 100 (and thus the backdrop image 214) such that the backdrop image 214 includes the selected frame of the video. In a particular example, the video can be composed of a sequence of frames, and the client collage generator component 202 can select a first frame in the sequence of frames to render for inclusion in the backdrop image 214. Thus, in an exemplary embodiment, the client collage generator component 202, for each object of a dynamic type, can render the backdrop image 214 such that a respective portion therein that represents an object of the dynamic type is a first frame of the object. In other examples, the client collage generator component 202 can analyze frames of the object of the dynamic type and select a most representative frame based upon, for example, motion between frames, a color signature of a frame, gradients in a frame, etc.

The client collage generator component 202 is also configured to generate metadata 216 that is descriptive of contents of the collage 100 (and thus the backdrop image 214). For example, the client collage generator component 202 can receive the collage 100 and identify the spatial position of the objects 102-108 therein. The client collage generator component 202 can then generate the metadata 216 and assign the metadata to the backdrop image 214, where the metadata indicates how the content of the collage 100 is to be laid out (e.g., identifies boundaries in the backdrop image 214 that respectively correspond to boundaries of the objects 102-108 in the collage 100). The metadata 216 may further include data that identifies respective sources of the objects 102-108 in the collage 100, and such source information can be assigned to the appropriate portions of the static image 214 that respectively correspond to the objects 102-108. The data that identifies the sources can include addresses of the objects 102-106 at the network-accessible storage locations 204-208 (e.g., www.source1.com/object1, www.source2.com/object2, www.source3.com/object3), may be textual descriptions of the sources of the objects 102-106 (e.g. source1, source2, source3), etc. In some cases, one or more of the network-accessible storage locations 204-208 can be storage of a content distribution network (CDN); in such a case, the data that identifies the sources can include data that identifies the CDN storage location and data that identifies an original source location.

Still further, the metadata 216 is interpretable by an application on a client computing device that requests the collage 100. For example, the application executing on the client computing device may be a web browser, a client-side social networking application, or other suitable application. Accordingly, for instance, the metadata 218 may conform to a scripting language that is interpretable by a virtual machine of the application executing on the client computing device. The metadata 216, when interpreted by the application at the client computing device, may cause the client computing device to 1) overlay graphical data on the backdrop image 214 when the client computing device renders the backdrop image 214; 2) overlay text extracted from the collage 100 on the backdrop image 214; 3) cause the client computing device to retrieve dynamic content (e.g., automatically or responsive to receipt of user input); 4) overlay dynamic content on an appropriate portion of the static image 214; and 5) retrieve an object responsive to receipt of user input with respect to a portion of the backdrop image 214 that is representative of the object.

With respect to overlaying graphical data on the backdrop image 214, when the client computing device receives the client collage 212, the client computing device can overlay a "play" button on the portion of the backdrop image 214 that is representative of the second (video) object 106. The client collage generator component 202 can include or identify the "play" button in the metadata 216. A user who is viewing the rendered collage on the client computing device can thus ascertain that the portion of the backdrop image 214 that corresponds to the second object 104 represents a video.

With respect to overlaying text extracted from the collage 100, the client collage generator component 202 can extract the text from the collage 100, and the metadata 218 can include such text as well as an identification of where the text is to be overlaid on the backdrop image 214 when the backdrop image 214 is rendered at the client computing device. This is to ensure that text in the collage 100 shows up clearly when rendered at the client computing device.

With respect to causing the client computing device to retrieve dynamic content and rendering the dynamic content over the appropriate location(s) of the backdrop image 214, the metadata 216, when interpreted by the application, can cause the client computing device to automatically retrieve dynamic content and overlay the dynamic content on the portion of the backdrop image 214 that is representative of the dynamic content. As noted above, the third object 106 may be an animated image that may desirably animate immediately at the client computing device. The client computing device receives the backdrop image 214, boundaries in the image that define the location of the third object 106 therein, and data that identifies the location of the third object 106 (e.g., the network-accessible storage location 208). The metadata 216, when interpreted by the application at the client computing device, causes the client computing device to retrieve the object 106 from the network-accessible storage location and overlay the object 106 (the animated image) on the portion of the backdrop image 214 that is representative of such object 106.

With respect to retrieving an object responsive to receipt of user input with respect to a portion of the backdrop image 214 that is representative of the object, as noted above the metadata 216 defines boundaries in the backdrop image 214. The metadata 216, when interpreted by the application at the client computing device, can cause the application to create a click overlay on the backdrop image 214. When a user selects a portion of the backdrop image that represents the first object 102, for example, the client computing device (based upon the click overlay) can be caused to retrieve the first object 102 from the first network-accessible storage location 204. In another example, when a user hovers over the portion of the backdrop image that represents the first object 102, a pop-up (e.g., tooltip) can be presented that describes the first object 102, the owner of the first object 102, the network-accessible storage location of the first object 102, etc.

Additionally, to ensure that the objects 102-108 have not expired, the client collage generator component 202 can be configured to periodically regenerate the client collage 212 (e.g., once every two days, once every two weeks, . . . ). If any of the objects 102-108 have expired (e.g., have been removed from their storage locations), the client collage generator component 202 can act as described above, marking the collage 100 as being invalid or reconstructing the collage. Moreover, the client collage generator component 202 can regenerate the client collage 212 when an indication is received that the collage 100 has been updated.

The client collage generator component 202 is associated with various advantages over conventional techniques for rendering collages on client computing devices. First, when the client computing device requests the collage 100, the client computing device need not access each of the storage locations 204-208 to render the collage 100. Instead, the client computing device accesses the data store 210 and retrieves the client collage 212, which includes the backdrop image 214 and the metadata 216. When the collage rendered at the client computing device includes dynamic content, the metadata 216 identifies when to retrieve the dynamic content and where such dynamic content is located. Further, using the client collage 212, the client computing device need not be tasked with downsampling any of the objects 102-106, as the client collage generator component 202 has already performed the requisite downsampling when forming the backdrop image 214 at the server. Still further, since the metadata can conform to a relatively common scripting language, the client computing device need not be configured with specialized applications for interpreting the metadata 216. For example, multiple different web browsers can be used to render the client collage 212. Moreover, a client computing device that depicts a collage based upon the client collage 212 will experience reduced latency compared with conventional approaches, as, in an exemplary embodiment, the client collage 212 can be served from a cookieless, static file content distribution network.

Moreover, while the above-description has referred to collages generated by end users, it is to be understood that the features described herein are not limited to such collages. For example, the client collage generator component 202 can be configured to pre-generate client collages for multiple automatically generated layouts.

Figures 3, 4:
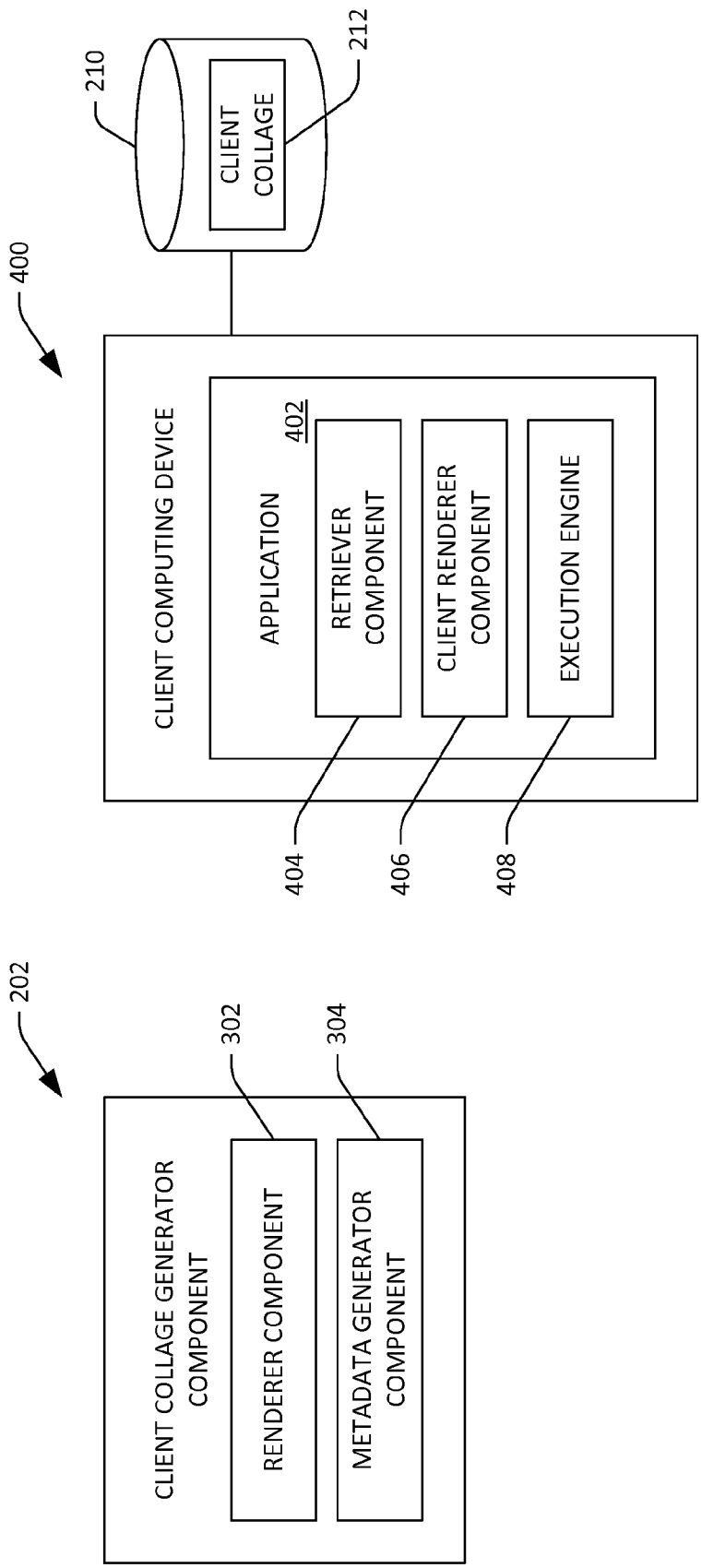
FIG. 3 is a functional block diagram of an exemplary client collage generator component.
FIG. 4 is a functional block diagram of a client computing device that renders a collage on a display screen thereof based upon a client collage generated by the client collage generator component.

Now referring to FIG. 3, an exemplary depiction of the client collage generator component 202 is illustrated. The client collage generator component 202 comprises a renderer component 302 that receives the collage 100 and accesses the network-accessible storage locations of the objects in the collage and renders the collage. As noted above, when rendering the collage, the renderer component 302 can select a first frame of each dynamic object included in the collage. The renderer component can then capture a static image of the rendered collage.

The client collage generator component 202 also includes a metadata generator component 304 that generates the metadata 216 referenced above. Specifically, the metadata generator component 304 can generate metadata that defines boundaries in the backdrop image 214 generated by the renderer component 302, wherein the boundaries correspond to the spatial arrangement of the objects 102-108 in the collage 100. Additionally, the metadata 216 generated by the metadata generator component 304 can identify the network accessible source locations of objects in the collage. Still further, the metadata generator component 304 can be configured to generate or otherwise identify graphical data that can be overlaid on the backdrop image 214 when a client computing device requests access to the collage 100. Thus, the metadata generator component 304 can extract text from the collage 100. Further, the metadata generator component 304 can generate metadata that is used to identify the types of objects represented in the static image. As noted above, the metadata 216 can be interpreted by an application executing on a client computing device that receives the metadata, wherein the application processes the metadata and renders the collage on a display screen based upon the metadata 216.

Now referring to FIG. 4, an exemplary client computing device 400 that can be used to present the collage 100 to a user of the client computing device 400 is illustrated. The client computing device 400 may be any suitable client computing device, including a mobile computing device, such as a mobile telephone, a tablet (slate) computing device, a wearable computing device (such as a watch), a phablet computing device (e.g., a computing device configured for use as a telephone and having a screen diagonal of 5.5 inches or greater), a laptop computing device, a convertible computing device, a video game console, a smart picture frame, or the like. In another example, the client computing device 400 may be a conventional desktop computing device.

The client computing device 400 executes an application 402 that can be used to present the collage 100 to the user of the client computing device 400. The application 402 may be a web browser, an application that is configured to interact with a social networking application (e.g., a client-side social networking application), or other suitable application. The application 402 is configured to issue a request for the collage 100, and is directed to the client collage 212 in the data store 210 (FIG. 2) responsive to issuing the request. The application 402 includes a retriever component 404 that retrieves the client collage 212 from the data store 212. In an example, when the application 402 is a web browser, the web browser can be directed to an Internet Protocol (IP) address of a web page of a social networking website that includes the collage 100. The web page may include a flag that directs the application 402 to the client collage 214 in the data store 212. The retriever component 404 can then retrieve the client collage 212 from the data store 210 (as identified in the web page).

The application 402 further includes a client renderer component 406 that renders the backdrop image 214 for display on a display screen of the client computing device 400. The application 402 can further include an execution engine 408 that is configured to process the metadata 216 in the client collage 212. Such metadata 216 can cause the client renderer component 406 to further render graphical overlay data on the backdrop image 214 displayed on the display screen. Again, the graphical overlay data may include graphical identifiers that identify respective objects in the collage 100 as being of respective types, text extracted from the collage 100 (e.g., where the text is included in a post that comprises the collage 100), etc.

The execution engine 408, responsive to processing the metadata 216, can cause the retriever component 404 to retrieve any dynamic content that is to be presented on the display screen of the client computing device 400. For instance, with respect to the animated image in the collage 100, the execution engine 408 can cause the retriever component 404 to retrieve the animated image from the third network-accessible storage location 208. The client renderer component 406 can then render the animated image, such that the animated image overlays the portion of the backdrop image that is representative of the animated image.

As noted above, the execution engine 408 can cause other actions to be undertaken responsive to receipt of user input with respect to the rendered backdrop image 214. For example, the execution engine 408 can detect that the user is hovering a cursor over a portion of the backdrop image 214, where the portion is representative of the first object 102. Responsive to detecting the hovering, the execution engine 408 can transmit data to the client renderer component 406 that causes a popup or tooltip to be displayed on the client computing device, wherein the popup includes data for the first object 102 (e.g., data that identifies the source of the first object 102, data that is descriptive of content of the first object 102, . . . ). In another example, the execution engine 408 can detect that the portion of the static image representative of the video has been selected, and responsive to detecting the selection, can cause the retriever component 404 to retrieve the video from the second network-accessible storage location 206. The client renderer component 406 can then cause the video to be played (e.g., where the video overlays the portion of the backdrop image 212 that is representative of the video). Therefore, the video is played as a portion of the collage. In still yet another example, the execution engine 408 can detect that the user has selected the portion of the backdrop image 212 that is representative of the first object 102, and responsive to performing such detection, can cause the retriever component 404 to retrieve the first object 102 from the first network-accessible storage location 204. For instance, the execution engine 408 can cause a new browser tab or window to be opened, wherein the new browser tab or window includes the first object 108.

Figure 5:
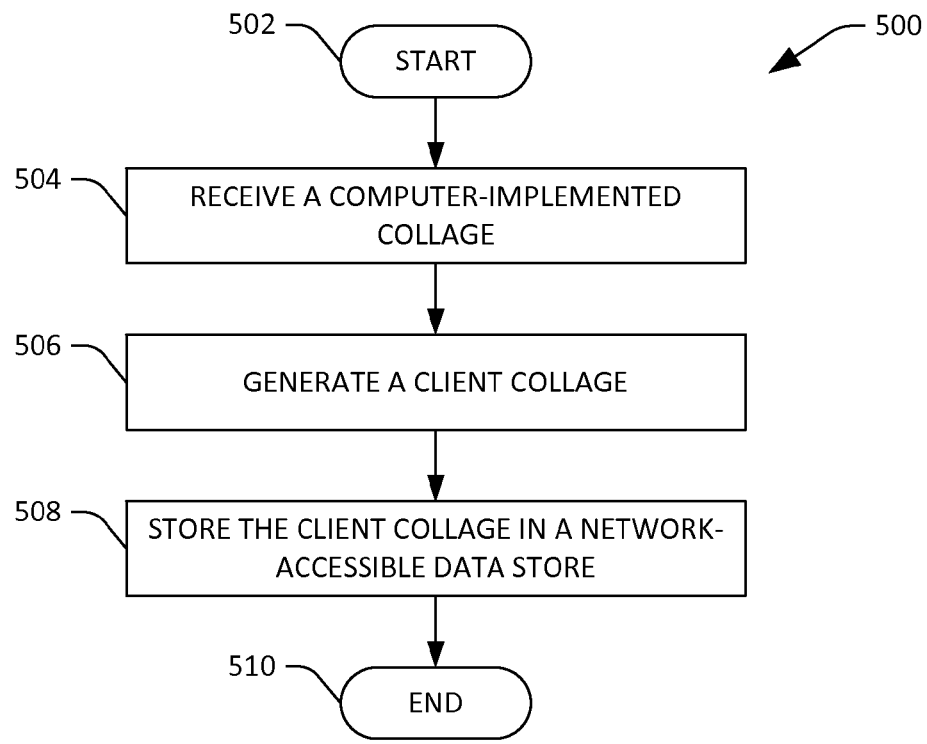
FIG. 5 is a flow diagram illustrating an exemplary methodology for generating a client collage based upon a created collage.
Figure 6:
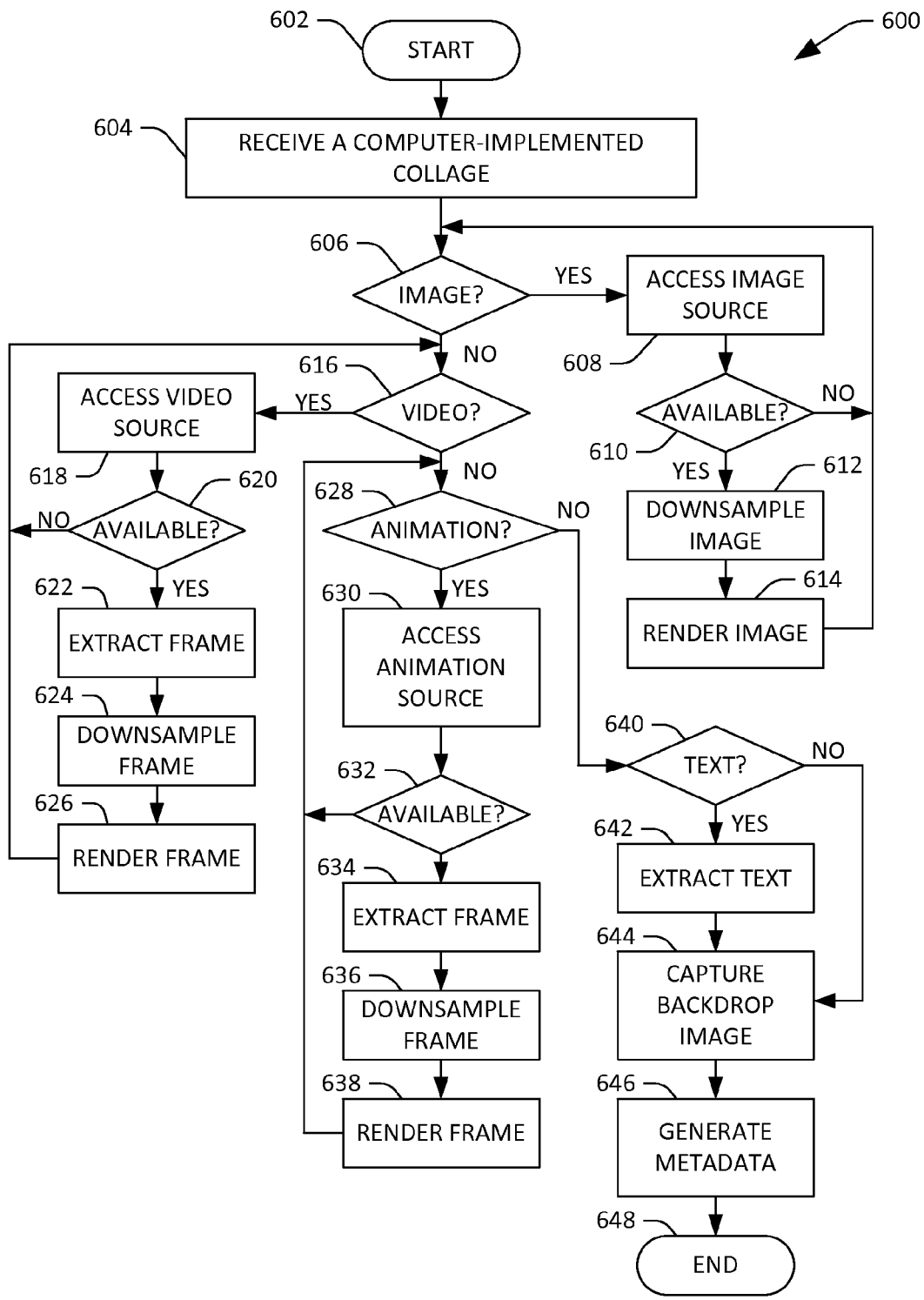
FIG. 6 is a flow diagram that illustrates an exemplary methodology for generating a client collage.
Figure 7:
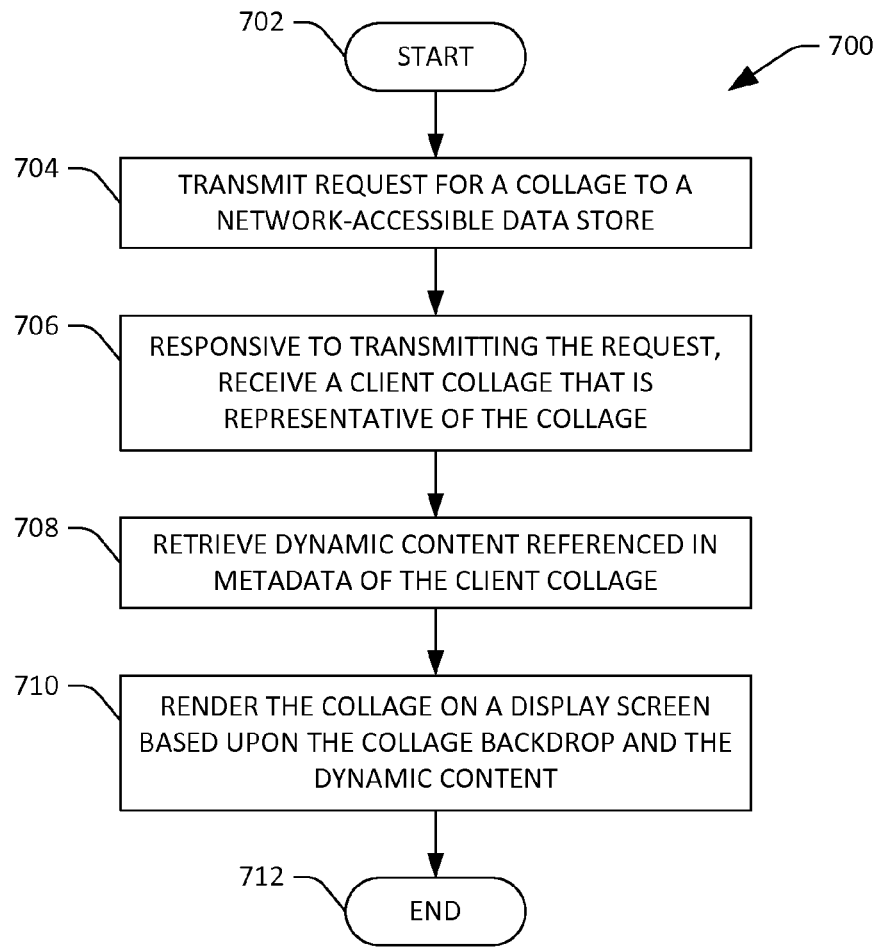
FIG. 7 is a flow diagram illustrating an exemplary methodology for rendering a collage on a display screen based upon a client collage.

FIGS. 5-7 illustrate exemplary methodologies relating to generation of a client collage and rendering of a collage on a client computing device based upon a client collage. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 5, an exemplary methodology 500 that facilitates generating a client collage based upon a created collage is illustrated. The methodology 500 starts at 502, and at 504 a computer-implemented collage (e.g., a created collage) is received. The computer-implemented collage comprises objects from respective source locations that are accessible by way of a network, wherein the objects have a spatial arrangement therein. At 506, responsive to receiving the computer-implemented collage, a client collage is generated. Generating the client collage comprises generating a computer-implemented backdrop image. The backdrop image comprises respective portions that are representative of the objects, wherein the portions have the spatial arrangement of the objects in the computer-implemented collage. Generating the client collage further includes generating metadata for assignment to the backdrop image. The metadata identifies boundaries of the portions in the backdrop image, and further identifies source locations of objects that are respectively represented by the portions. The metadata, when processed by an application executing at a client computing device, causes the collage to be laid out at the client computing device in the manner intended by the creator of the collage. Accordingly, the client collage includes the backdrop image and the metadata.

At 508, the client collage is stored in a network-accessible data store, wherein the client collage is servable to a client computing device responsive to receipt of a request for the collage from the client computing device. The methodology 500 completes at 510.

Now referring to FIG. 6, an exemplary methodology 600 that facilitates generating a client collage is illustrated. The methodology 600 starts at 602, and at 604 a computer-implemented collage is received. As noted above, the computer-implemented collage can comprise objects from respective source locations on a network, wherein the objects have a particular spatial arrangement in the collage. The computer-implemented collage can be received responsive to receiving an indication that a user wishes to publish the computer-implemented collage, responsive to receiving an indication that the computer-implemented collage has been updated, responsive to receiving an indication that a threshold amount of time has passes since a client collage has been generated for the computer-implemented collage, etc.

At 606, a determination is made regarding whether the collage includes an image. If the collage includes an image, then the methodology proceeds to 608, where a source of the image (e.g., a network-accessible data store that comprises the image) is accessed. At 610, a determination is made regarding whether the image is available at the image source. If the image is not available at the image source (if the owner of the image has removed the image from the network-accessible data store), then the methodology 600 returns to 606, where the collage can be analyzed for another image. When it is determined at 610 that the image is available at the image source, then at 612 the image is retrieved and (optionally) downsampled. At 614, the downsampled image is rendered at a position on a canvas selected by a creator of the computer-implemented collage. The methodology 600 then returns to 606.

When it is determined at 606 that there are no (further) images in the collage, at 616 a determination is made regarding whether the computer-implemented collage includes a video. If it is determined that the computer-implemented collage includes a video, then at 618 the source of the video is accessed (e.g., a network-accessible data store that comprises the video is accessed). At 620, a determination is made regarding whether the video is available at the accessed data store. If the video is unavailable (has been removed from the data store), then the methodology 600 returns to 616. If it is determined at 620 that the video is available, then at 622 a frame is extracted from the video (e.g., a first frame of the video), and at 624 the frame is (optionally) downsampled. At 626, the downsampled frame is rendered in the canvas at a position thereon selected by a creator of the computer-implemented collage. Responsive to the frame being rendered at 626, the methodology 600 returns to 616.

When there are no (further) videos in the collage, the method 600 proceeds to 628, where a determination is made regarding whether the computer-implemented collage includes an animation (e.g., an animated image or interactive game). If it is determined at 628 that the collage includes an animation, then at 630 the source of the animation (e.g., a network-accessible data store that comprises the animation) is accessed. At 632, a determination is made regarding whether the animation is available at the animation source. If the animation is found to be unavailable (e.g. removed from the animation source by an owner of the animation), then the methodology 600 returns to 628. If the animation is available at the animation source, at 634 the animation is retrieved and a frame of the animation is extracted (e.g., a first frame of the animation). At 636, the frame is (optionally) downsampled if necessary, and at 638 the downsampled frame is rendered in the canvas at the position identified by the creator of the collage. The methodology 600 then returns to 628.

After the images (including text), videos, and animations have been rendered, a determination is made at 640 as to whether the computer-implemented collage includes text. For example, the computer-implemented collage may include a textual portion posted by a creator of the collage, wherein the collage (including the text) is to be posted on a social networking site. When the computer-implemented collage comprises a text portion, at 642 the text from such portion is extracted from the computer-implemented collage. When there is no text associated with the collage or subsequent to the text being extracted from the collage, then at 644, a backdrop image is captured, wherein the backdrop image is an image of the rendered objects (e.g., images (including text), video frames, and animated image frames). At 646, metadata is generated (as described above), and the backdrop image and metadata can be stored as a client collage. The methodology 600 completes at 648.

Turning now to FIG. 7, an exemplary methodology 700 that can be executed at a client computing device when rendering a collage is illustrated. The methodology 700 starts at 702, and at 704 a request for a collage is transmitted to a network accessible data store. For instance, such request may be a user accessing a social networking website that is used to create and post collages. At 706, responsive to transmitting the request, a client collage is retrieved, wherein the client collage is representative of the collage. As noted above, client collage includes the backdrop image and metadata. At 708, dynamic content referenced in the metadata of the client collage is retrieved. For example, the metadata, when processed at the client computing device, can cause the client computing device to retrieve the dynamic content from a network accessible data store identified in the metadata. At 710, the collage is rendered on a display screen of the client computing device based upon the client collage and the dynamic content retrieved at 708. The methodology 700 completes at 712.

Figure 8:
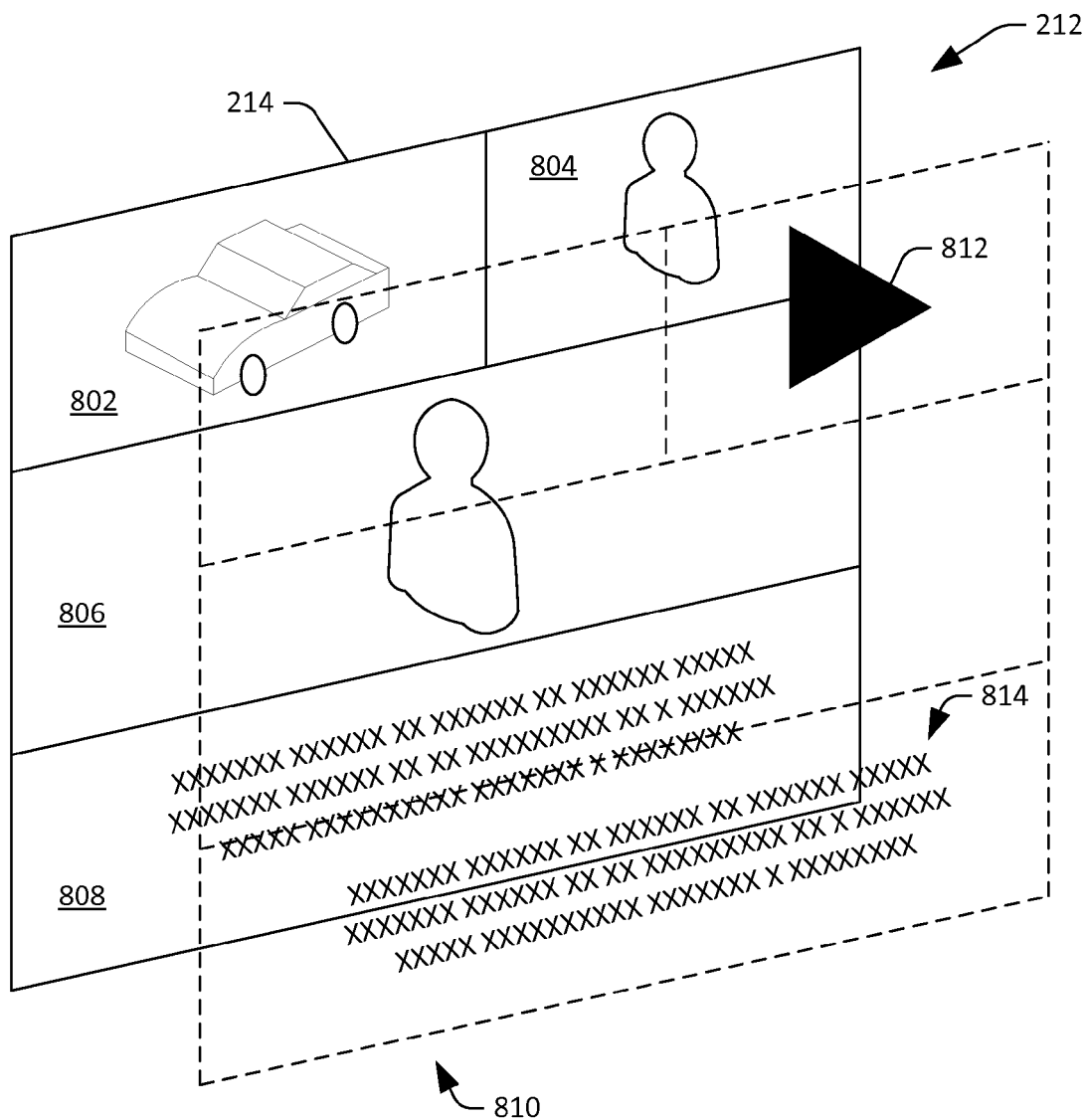
FIG. 8 illustrates an exemplary backdrop image and corresponding overlay data.

Turning now to FIG. 8, an exemplary depiction of the client collage 212 is presented. The client collage 212 includes the backdrop image 214 that includes portions 802-808 that are respectively representative of the objects 102-108 included in the collage 100. The metadata, when processed by the client computing device, can cause an overlay 810 to be created. The overlay 810 includes boundaries (shown in dashed line) of the portions 802-808 in the static image 216. The overlay 810 further includes graphical indicator 812 that can be overlaid on the portion 804 that is representative of the second object 104 (which is a video). Accordingly, an end-user, when the client collage 212 is rendered on a client computing device, can quickly determine that the portion 804 corresponds to a video. The overlay 810 can further include text 814 that can be positioned to overlay the text in the backdrop image 214 (e.g., positioned over the portion 808 of the backdrop image 214).

Figure 9:
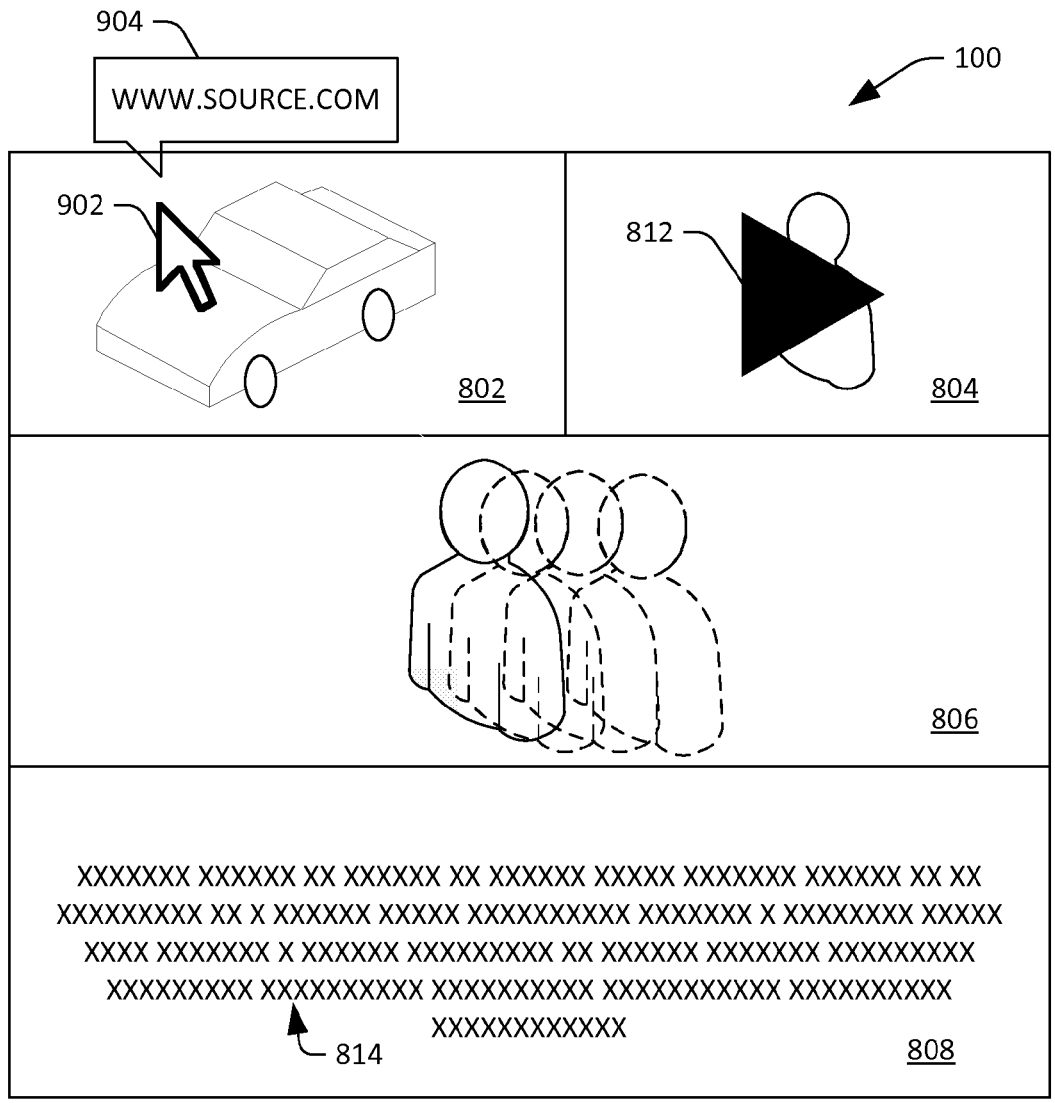
FIG. 9 illustrates an exemplary collage rendered on a client computing device.

With reference to FIG. 9, an exemplary depiction of the collage 100 when rendered at the client computing 400 device is shown. The client computing device renders the backdrop image 214, and thus the portions 802-808 are presented on the display screen of the client computing device. The graphical indicator 812 is overlaid on the portion 804 that is representative of the second object 104 (e.g., the video). The text 814 is overlaid on the backdrop image 214 to cause the text 814 to be presented clearly to the end-user. The third object 106 (the animated image) is retrieved by the client computing device 400 and overlaid on the portion 806 that is representative of the animated image. Thus, as shown, the animated image is animated at the appropriate location in the collage 100.

When the end-user places a cursor 902 on the first portion 802 and hovers such cursor, for example, a pop-up 904 can be presented, wherein the pop-up 904 includes attribution information (e.g. identifies the source of the first object 102 represented by the first portion 802). If the user were to "click" the first portion 802, then the application 402 executing on the client computing device 400 can retrieve the first object 102 from the first network-accessible storage location 204.

Figure 10:
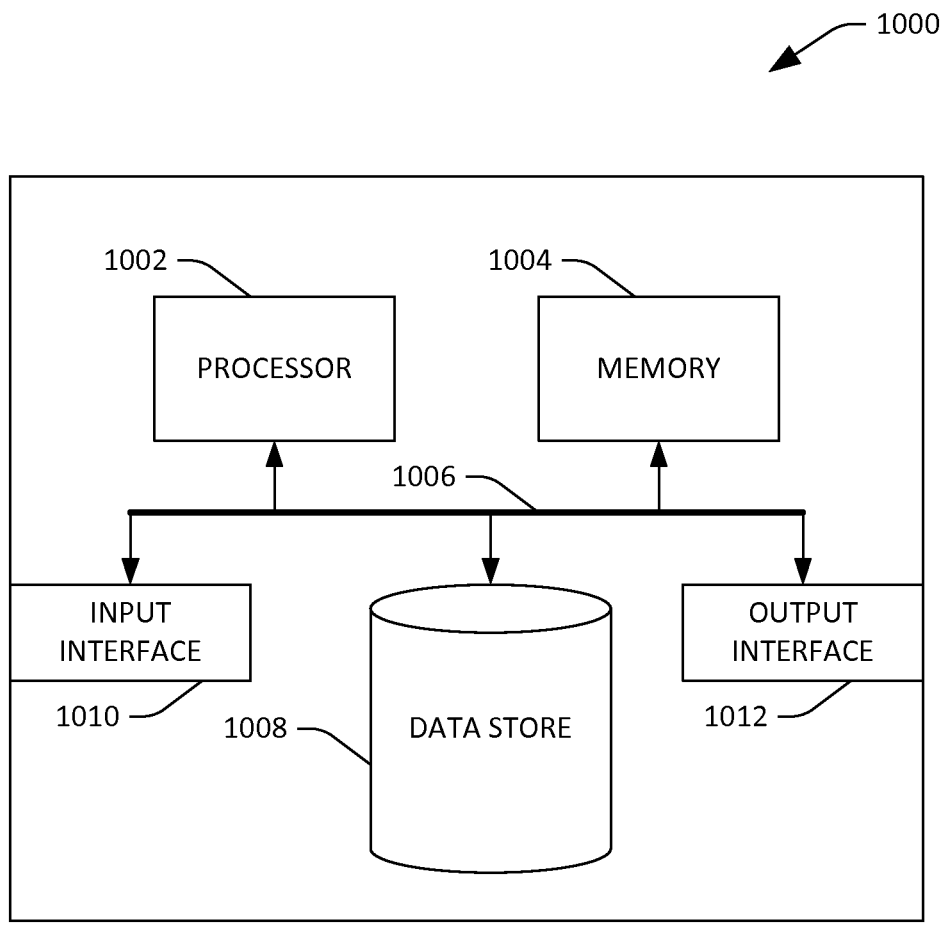
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that supports generating a client collage. By way of another example, the computing device 1000 can be used in a system that renders a collage on a client computing device based upon a client collage. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store objects (including images, video frames, animated image frames), text, social networking posts, etc.

The computing device 1000 additionally includes a data store 1008 that is accessible by the processor 1002 by way of the system bus 1006. The data store 1008 may include executable instructions, client collages, created collages, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
receiving a computer-implemented collage, the collage comprising objects from respective source locations on a network, the objects having a spatial arrangement in the collage;
responsive to receiving the computer-implemented collage, generating a client collage, wherein generating the client collage comprises:
generating a computer-implemented backdrop image, the backdrop image comprising portions that are respectively representative of the objects, the portions arranged in the spatial arrangement; and
generating metadata for the backdrop image, the metadata identifying:
boundaries of the portions of the objects in the image; and
respective locations of the objects on the network, the client collage comprising the backdrop image and the metadata; and
storing the client collage at a network-accessible storage location, the client collage servable to a client computing device responsive to receipt of a request for the collage from the client computing device.

2. The method of claim 1, the objects comprising a video from a first source location, the collage comprising the video at a first position therein, and generating the client collage comprises:
receiving, from the first source location, a frame of the video; and
generating the backdrop image based upon the frame of the video, the backdrop image comprising an image of the frame of the video at a position therein that spatially corresponds to the first position in the collage, the metadata comprising data that identifies the first source location.

3. The method of claim 2, the video composed of a plurality of frames that are arranged in a sequence, the frame being a first frame in the sequence.

4. The method of claim 1, the objects comprising an animated image from a first source location, the collage comprising the animated image at a first position therein, and generating the client collage comprises:
obtaining, from the first source location, a frame of the animated image; and
generating the backdrop image based upon the frame of the animated image, the backdrop image comprising an image of the frame of the animated image at a position therein that spatially corresponds to the first position in the collage, the metadata comprising data that identifies the first source location.

5. The method of claim 1, the objects comprising a plurality of images, generating the client collage further comprises:
retrieving the plurality of images from their respective locations on the network;
downsampling each image in the plurality of images to generate a respective plurality of downsampled images; and
generating the backdrop image based upon the respective plurality of downsampled images.

6. The method of claim 1, the objects being of respective different media types.

7. The method of claim 1, further comprising:
receiving, from the client computing device, a request for a web page that comprises the collage; and
responsive to receiving the request, serving the web page to the client computing device, the web page comprising data that identifies the network-accessible location of the client collage.

8. The method of claim 1, further comprising:
receiving, from the client computing device, a request for the collage; and
responsive to receiving the request for the collage, transmitting the client collage to the client computing device.

9. The method of claim 1, further comprising:
subsequent to the client collage being generated, re-generating the client collage, wherein re-generating the client collage comprises:
requesting an object in the objects from its respective source location in the source locations;
receiving an indication that the object is no longer accessible at the source location; and generating an updated backdrop image based upon the indication that the object is no longer accessible at the source location, the updated backdrop image comprising a blank space at a position in the backdrop image that corresponds to a position of the object in the collage.

10. The method of claim 1, the collage comprises text, and generating the client collage comprises:
identifying a position of the text in collage;
extracting the text from the collage; and
generating the metadata to include:
the text extracted from the collage; and
the position of the text in the collage, wherein when the client collage is rendered at the client computing device, the text extracted from the collage is overlaid on the backdrop image at a position thereon that corresponds to the position of the text in the collage.

11. The method of claim 1, further comprising:
expiring the client collage responsive to a threshold amount of time passing from the generating of the client collage.

12. A system comprising:
a processor; and
a memory that comprises a client collage generator component that is executed by the processor, the client collage generator component configured to:
receive a computer-implemented collage, the computer-implemented collage comprising a plurality of objects from a respective plurality of network-accessible source locations, the plurality of objects arranged in the collage in a spatial arrangement;
responsive to receipt of the computer-implemented collage, generating a client collage, the client collage comprising:
a backdrop image that comprises a plurality of portions, the portions respectively corresponding to the objects in the computer-implemented collage, the portions arranged in the spatial arrangement; and
metadata that identifies:
boundaries of the portions in the backdrop image; and
the network-accessible source locations of the objects that respectively correspond to the portions; and
responsive to generating the client collage, storing the client collage in computer-readable data storage at a network location that is accessible to a client computing device that issues a request for the computer-implemented collage.

13. The system of claim 12, the plurality of objects comprising at least one image and at least one video, wherein the client collage generator component generates the client collage such that a portion in the plurality of portions that corresponds to the at least one video includes a frame that is representative of content of the at least one video.

14. The system of claim 13, the metadata further comprising:
graphical data that, when interpreted at the client computing device, is overlaid on the portion that corresponds to the video, the graphical data indicating that the portion represents the video; and
a link to a network-accessible source location of the video, the link overlaying the portion of the backdrop image that corresponds to the video when the client collage is rendered at the client computing device.

15. The system of claim 12, the metadata written in conformance with a scripting language.

16. The system of claim 15, the metadata, when processed by the client computing device, configured to cause the client computing device to retrieve dynamic content responsive to receiving user input with respect to content rendered on a display screen of the client computing device.

17. The system of claim 12, the plurality of objects being of a plurality of different respective media types.

18. The system of claim 17, the media types comprising an image type, a video type, or an animated image type.

19. The system of claim 12, wherein the client collage generator component is further configured to:
extract text from the computer-implemented collage; and
include instructions in the client collage that cause the client computing device to overlay the text extracted from the object onto the backdrop image when rendered at the client computing device.

20. A computer-readable storage medium comprising instructions that, when executed by a processor, cause the processor to perform acts comprising:
receiving a collage, the collage comprising a plurality of objects of a respective plurality of different types, the plurality of objects retrievable from a respective plurality of network-accessible data stores, the plurality of objects arranged in a spatial arrangement in the collage;
receiving a request to publish the collage as at least a portion of a post by way of a social media application;
responsive to receiving the collage and the request, generating a client collage, wherein generating the client collage comprises:
generating a backdrop image that comprises a plurality of portions that are respectively representative of the plurality of objects, the plurality of portions arranged in the spatial arrangement in the backdrop image;
generating metadata, the metadata, when processed at a client computing device, causing an interactive overlay to be placed over the backdrop image; and
storing the client collage in a network-accessible location, wherein the client collage is retrieved responsive to the client computing device accessing the post.

* * * * *